(12) United States Patent
Shi et al.

(10) Patent No.: US 10,148,291 B2
(45) Date of Patent: Dec. 4, 2018

(54) PRACTICAL DYNAMIC PROOFS OF RETRIEVABILITY WITH MULTIPLE BUFFERS

(71) Applicants: University of Maryland, College Park, MD (US); The Regents of the University of California, Oakland, CA (US)

(72) Inventors: Elaine Shi, Silver Spring, MD (US); Emil Stefanov, Hayward, CA (US); Charalampos Papamanthou, Silver Spring, MD (US)

(73) Assignees: University of Maryland, College Park, College Park, MD (US); The Regents of the University of California, Oakland, CA (US)

( * ) Notice: Subject to any disclaimer, the term of this patent is extended or adjusted under 35 U.S.C. 154(b) by 145 days.

(21) Appl. No.: 14/696,012

(22) Filed: Apr. 24, 2015

(65) Prior Publication Data

US 2015/0309863 A1   Oct. 29, 2015

Related U.S. Application Data

(60) Provisional application No. 61/983,856, filed on Apr. 24, 2014.

(51) Int. Cl.
*G06F 11/10* (2006.01)
*G06F 3/06* (2006.01)
(Continued)

(52) U.S. Cl.
CPC ........ *H03M 13/373* (2013.01); *H04L 9/3218* (2013.01); *G06F 3/064* (2013.01);
(Continued)

(58) Field of Classification Search
CPC .... G06F 11/1004; G06F 3/0619; G06F 3/064; G06F 3/0673; G06F 21/60; H04L 9/32; H04L 9/3202; H04L 9/3205; H04L 9/321; H04L 9/3218; H04L 9/3226; H04L 9/3228; H04L 9/3244; H04L 9/3271; H04L 9/3276
See application file for complete search history.

(56) References Cited

U.S. PATENT DOCUMENTS 8,132,073 B1 * 3/2012 Bowers ............. H03M 13/3761
   714/755
8,706,701 B1 * 4/2014 Stefanov ........... G06F 17/30197
   707/687

OTHER PUBLICATIONS

Chris Erway, et al; "Dynamic Provable Data Possession", Brown University, 2009.*

(Continued)

*Primary Examiner* — Albert Decady
*Assistant Examiner* — Christian Dorman
(74) *Attorney, Agent, or Firm* — Squire Patton Boggs (US) LLP

(57) ABSTRACT

Certain embodiments of the present invention involve a method of storing an erasure coded copy of block data, and storing newly updated block data into a separate erasure-coded log structure. The method also includes auditing both the erasure copy of block data and the newly updated block data. The erasure copy of block data and the newly updated block data are probabilistically checked during the audit. In certain other embodiments the newly updated block data is stored in a log structure.

19 Claims, 7 Drawing Sheets

(51) Int. Cl.
*H03M 13/37* (2006.01)
*H04L 9/32* (2006.01)
*G06F 21/60* (2013.01)

(52) U.S. Cl.
CPC .......... *G06F 3/0619* (2013.01); *G06F 3/0673* (2013.01); *G06F 11/1004* (2013.01); *G06F 21/60* (2013.01); *H04L 9/32* (2013.01); *H04L 9/321* (2013.01); *H04L 9/3271* (2013.01)

(56) References Cited

OTHER PUBLICATIONS

David Cash, et al; "Dynamic Proofs of Retrievability via Oblivious RAM", International Association for Crypotologic Research, 2013.*

* cited by examiner

Figure 4
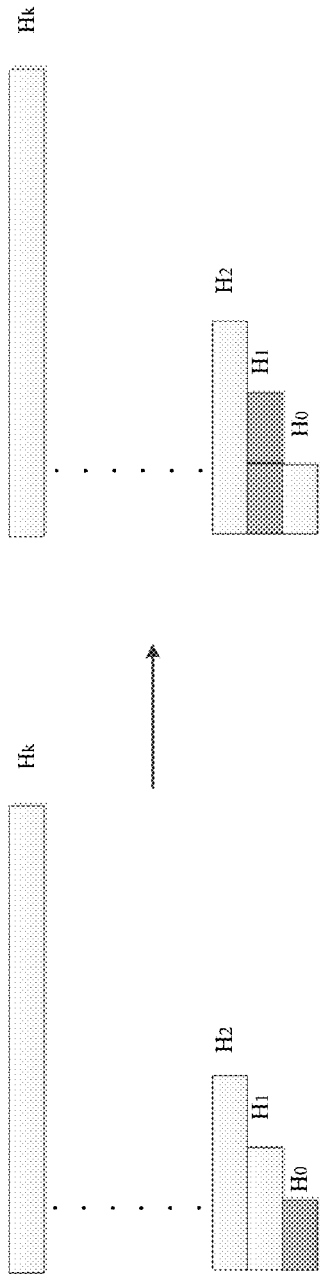
Figure 4(a)
Figure 4(b)
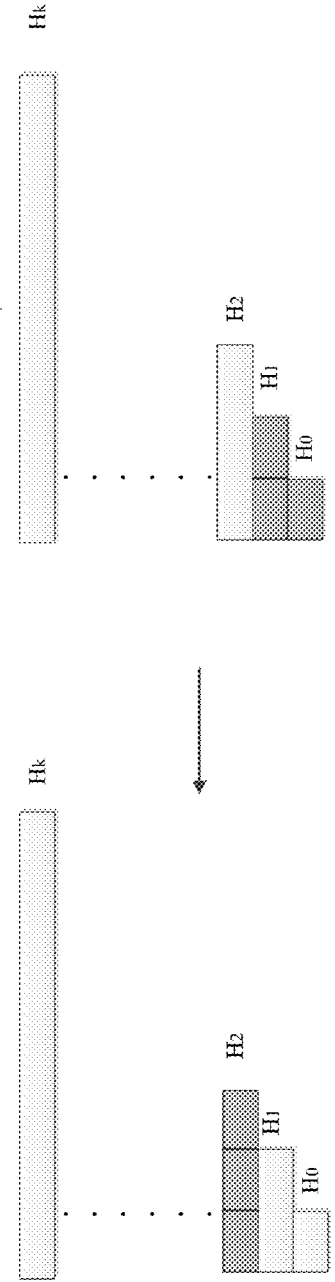
Figure 4(d)
Figure 4(c)

Figure 6
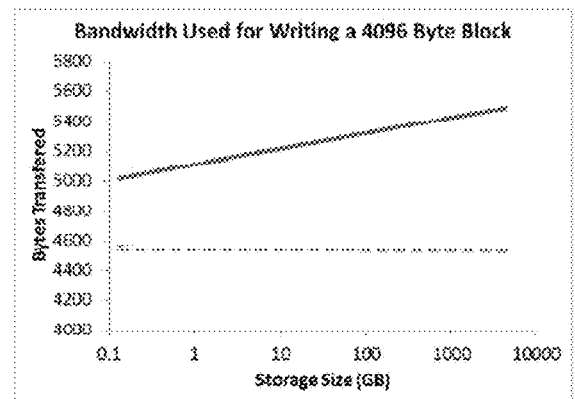
Figure 6(a)
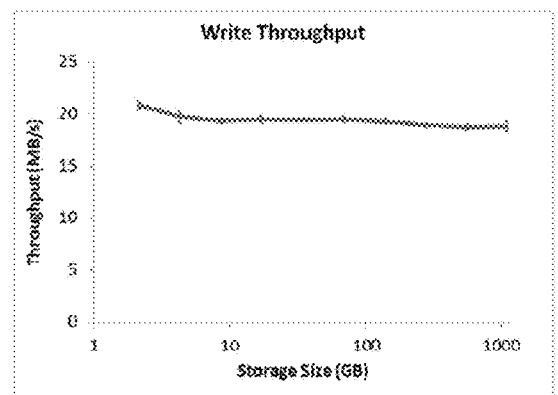
Figure 6(b)
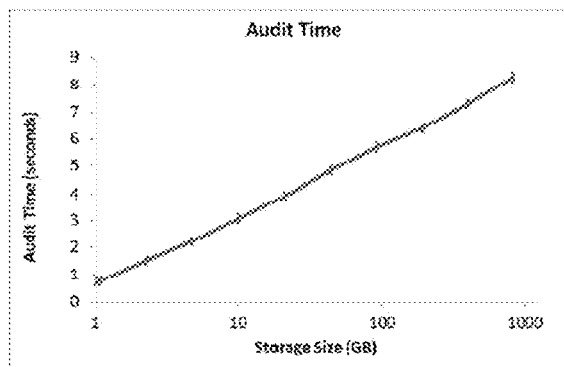
Figure 6(c)

PRACTICAL DYNAMIC PROOFS OF RETRIEVABILITY WITH MULTIPLE BUFFERS

CROSS-REFERENCE TO RELATED APPLICATION

This application is related to and claims the benefit and priority of U.S. Provisional Patent Application No. 61/983,856 filed Apr. 24, 2014, the entirety of which is hereby incorporated herein by reference.

GOVERNMENT LICENSE RIGHTS

This invention was made with government support under CNS1314857 awarded by NSF. The government has certain rights in the invention.

BACKGROUND

Field

Various clients may benefit from techniques and devices for authentication and retrievability of stored data in a server. For example, a client may benefit from a dynamic proof of retrievability scheme in a cloud based server.

Description of the Related Art

Storage outsourcing applications have become increasingly popular in cloud based computing. These applications offer various benefits which involve economies of scale and general accessibility. When a cloud storage provider is untrustworthy, an important challenge is presented in offering provable outsourced storage guarantees.

In particular, clients search for authenticated storage and retrievability as two such guarantees. Authenticated storage refers to the client may wanting to verify that data fetched from the server is correct, where correctness includes both authenticity and freshness. Retrievability, on the other hand, refers to the client needing assurance that the server is indeed storing all of the client's data, and that no data loss has occurred.

Proof of Retrievability (POR) provides a method by which a client can have these provable outsourced storage guarantees without having the client individually check each stored data block in the cloud server. In general, POR enables the client to audit data blocks on the server side storage, and be able to prove that the server side storage possesses the data without having to individually download and check all the data blocks. This auditing process is more efficient, and demands a fractional amount of the bandwidth needed to download individual files.

While many static POR schemes have been constructed, an efficient light-weight dynamic POR construction with manageable bandwidth overhead and client side computation is lacking. A dynamic POR scheme, however, presents the additional challenge of needing to check the authenticity and retrievability of data blocks which are either continuously or discretely being updated.

Another scheme used to audit outsourced data is called Proofs of Data Possession (PDP). PDP, however, provides much weaker security guarantees than PoR. With PDP, a server that has lost a small number of data blocks can pass an audit with significant probability. A successful POR, on the other hand, ensures that the server maintains knowledge of all outsourced data block, as opposed to storing most of the data as ensured by PDP.

An approach which shares a similar defect to PDP is a strawman approach, which involved the client attaching a Message Authentication Code (MAC) to every block before uploading it to the server. When using MACs, however, even if the server has lost a small number of blocks, it can still pass the audit with significant probability.

In order to boost detection probability, some approaches have relied on redundant coding known as erasure codes. As an example, if the client outsources a total of n blocks, which are erasure coded into $m=(1+c)$ n blocks for some constant $0<c\leq 1$, and knowledge of any block n suffices to recover the entire dataset, the server has to delete at least cn blocks to actually incur data loss. If the server deletes this many blocks, however, it will fail the audit protocol with overwhelming probability of at least $1-1/(1+c)^\lambda$, where $\lambda$ represents number of random code block checked during authentication.

Another tremendous obstacle involved in using erasure codes has to do with dynamic use of data. If the client wants to update a single block n, the client can also be forced to update all the cn parity blocks, which can be very expensive and costly. As such, a better POR scheme needs to be developed to deal with dynamic data.

A recent impractical dynamic POR construction, which attempts to support updating cn parity blocks, involves the use of an Oblivious RAM (ORAM). This method attempts to achieve asymptotic efficiency in the presence of updates with constant client storage by relying on an ORAM. ORAM is a rather heavy-weight cryptographic primitive, and even the fastest known constructions of ORAM incur a large bandwidth overhead in practice. As an example, known ORAM constructions demand that over 400 blocks be transferred between a client and a server for a single data access. Therefore, the use of ORAM to address dynamic POR construction is impractical.

Certain embodiments of the claimed invention provide an efficient implementation of a dynamic POR scheme whose bandwidth cost can be comparable to a Merkle hash tree.

SUMMARY

According to certain embodiments, a method can include storing an erasure coded copy of block data, and storing newly updated block data into a separate erasure-coded log structure. The method can also include auditing both the erasure copy of block data and the newly updated block data. The erasure copy of block data and the newly updated block data are probabilistically checked during the audit.

A method, according to certain embodiments, can include storing an erasure coded copy of block data, and storing newly updated block data into a separate erasure-coded log structure. The log structure contains at least one level. The method can also include auditing both the erasure copy of block data and the newly updated block data, where the erasure copy of block data and the newly updated block data are probabilistically checked during the audit, and writing the newly updated block data on the separate erasure-coded log structure. The at least one level of the separate erasure-coded log structure are consecutively filled, and a rebuilding level is created, which contains all the newly updated block data. The newly updated block data is updated in logarithmic time. In addition, when the rebuilding level is created, at least one level of the separate reassure-coded log structure is emptied.

According to certain embodiments, an apparatus can include at least one memory, at least one processor, and the at least one memory is configured with the at least one processor to cause the apparatus at least to store an erasure coded copy of block data. The at least one memory is also configured with the at least one processor to cause the apparatus at least to store newly updated block into a separate erasure-coded log structure, and audit both the erasure copy of block data and the newly update block data. The erasure copy of block data and the newly update block data are probabilistically checked during the audit.

An apparatus, according to certain embodiments, can include a storing means for storing an erasure coded copy of block data, and a storing means for storing newly updated block data into a separate erasure-coded log structure. The apparatus can also include auditing means for auditing both the erasure copy of block data and the newly update block data. The erasure copy of block data and the newly updated block are probabilistically checked during the audit.

According to certain embodiments, a non-transitory computer-readable medium encoding instructions that, when executed in hardware, perform a process. The process can include storing an erasure coded copy of block data, and storing newly updated block data into a separate erasure-coded log structure. The process can also include auditing both the erasure copy of block data and the newly updated block data. The erasure copy of block data and the newly updated block data are probabilistically checked during the audit.

BRIEF DESCRIPTION OF THE DRAWINGS

For proper understanding of the invention, reference should be made to the accompanying drawings, wherein:

FIGS. 4(a)-4(e) illustrate a diagram of erasure-coded recently written blocks according to certain embodiments.

FIG. 6(a) illustrates a graph for the amount of client-server bandwidth for writing a 4 Kb block.

FIG. 6(b) illustrates a graph of the write throughput (MB/s).

FIG. 6(c) illustrates a graph of the audit time (seconds).

DETAILED DESCRIPTION

Figure 1:
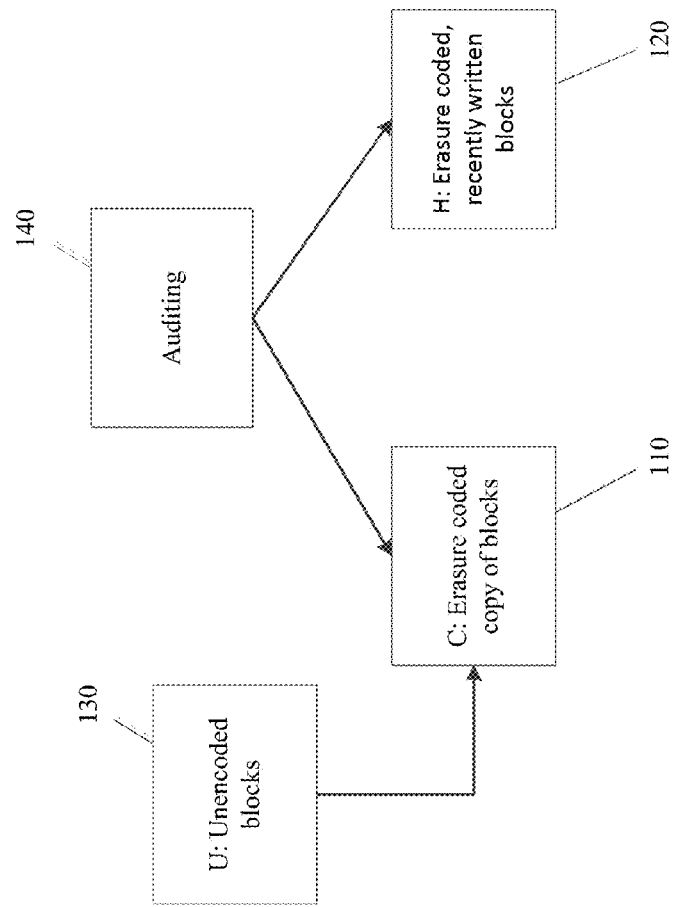
FIG. 1 illustrates a method of the POR scheme according to certain embodiments.

A client can be any user equipment, whether a handheld mobile device, a computer, or any other network device capable of communicating with a storage side server. The user equipment may include any memory, processor, hardware, or any combination thereof. In certain embodiments of the user equipment, the processor and the method can be configured to cause the user equipment to undergo a process.

A storage side server may include of any memory, processor, hardware, or any combination thereof, which enables the storing data. In certain embodiments of the storage server, the processor and the method can be configured to cause the storage side server to undergo a process. The storage side server can either be cloud based or non-cloud based.

When a client looks at the available data on the storage side server in order to retrieve data, the client can be said to be performing a "read".

When a client adds data to the server side storage, thereby updating data blocks, he can be said to be performing a "write".

In certain embodiments, a dynamic POR scheme can be a collection of the following four protocols between a client (C) and a server (S):

(st, $\overline{M}$)←Init ($1^\lambda$, n, β, M): The inputs may include the security parameter λ and the database M of n β-bit-size entries, it outputs may include the client state st and the server state $\overline{M}$.

{B, reject}←Read (i, st, $\overline{M}$): The inputs may include an index i∈[n], the client state st and the server state $\overline{M}$, the outputs may include B+M[i] or reject.

{(st', $\overline{M}$), reject}←Write (i, B, st, $\overline{M}$): The inputs may include an index i∈[n], data B, the client state st and the server state $\overline{M}$, it may set M[i]=B and may output a new client state st' and a new server state $\overline{M}'$ or reject.

{accept, reject}←Audit (st, $\overline{M}$): The input may include the client state st and the server state $\overline{M}$, and the outputs may include either an acceptance or a rejection.

Certain embodiments of the dynamic POR scheme can have either secret or public verifiability, depending on whether the client state st must be kept secret or not.

As discussed above, the client may want to have certain security guarantees when storing information in the outsourced server side storage. One such security guarantee may be authenticity. Authenticity may require that a client always be able to detect if any message sent by the server deviates from honest behavior, meaning that the data fetched from the server is incorrect. In certain other embodiments, authenticity may allow for a negligible probability of mistake. One embodiment of authenticity can be represented by the following, where C can be a challenger, S* can be a malicious server, and S can be an honest server:

S* chooses initial memory M. C runs Init ($1^\lambda$, n, β, M) and sends the initial memory layout $\overline{M}$ to S*. C also interacts with S and sends M to S. For polynomial number of steps t=1, 2, . . . , poly(λ), S* picks an operation $op_t$ where operation $op_t$ can be either Read (i, st, $\overline{M}$) or Write (I, B, st, $\overline{M}$) or Audit (st, $\overline{M}$). C executes the protocol with both S* and S.

S* is said to win the game if at any time, the message sent by S* differs from that of S, and C did not output a rejection, but instead outputted an acceptance.

In the above represented authenticity embodiment, a POR scheme may satisfy adaptive authenticity, if no polynomial-time adversary S* has more than negligible probability in winning the above security game.

A second security guarantee may be retrievability. Retrievability may require that whenever a malicious server can pass the audit test, the server must know the entire memory contents M. In some embodiments, a client may be able to extract M by repeatedly running the audit protocol with the server. Certain embodiments of retrievability can be represented by the three phase process, also referred to as the retrievability security game, described below.

An initialization phase can be the first step in certain embodiments of retrievability. In the initialization phase an adversary S* chooses the initial memory M. The challenger runs Init ($1^\lambda$, n, β, M), and uploads the initial layout $\overline{M}$ to S*.

A query phase can be the second step in certain embodiments of retrievability. For steps t=1, 2, . . . , poly(λ), S* adaptively chooses an operation $op_t$ where operation $op_t$ can be of the form Read (i, st, $\overline{M}$) or Write (I, B, st, $\overline{M}$) or Audit (st, $\overline{M}$). Challenger C executes the respective protocols with S*. At the end of the query phase, the state of the challenger and the adversary can be represented by $state_c$, and $state_s$, respectively, and the final state of the memory contents may be M.

A challenge phase can be the third step in certain embodiments of retrievability. The challenger now gets blackbox rewinding access in the configuration state$_s$. The challenger C runs the audit protocol repeatedly for a polynomial number of times with the server S*, starting from the configuration (state$_c$, state$_s$). The audit protocol then outputs a transcript of all the successful Audit executions, represented by $\pi_1, \pi^2, \ldots, \pi_{poly(\lambda)}$.

In the embodiments of retrievability discussed above, a POR scheme satisfies retrivability if there exists a polynomial-time extractor algorithm denoted M'←Extract (state$_c$, $\{\pi_i\}$), such that if S* passes the audit protocol, the Extract algorithm can output the correct memory contents M'=M except with negligible probability. The correct memory can be the contents of the memory M after the end of the query phase in the security game.

In certain embodiments, the server-side storage can be organized with at least one buffer. The buffer can be any memory, processor, hardware, or combination thereof. In certain embodiments, the memory and the processor are configured to cause the buffer to undergo a process. In the particular embodiment shown in FIG. 1, the server-side storage contain three different buffers: an erasure coded copy buffer (c); ii) a hierarchical erasure-coded log structure (H); and iii) a raw buffer (U).

In certain embodiments, the erasure-coded copy of the data can be stored in step 110 in buffer C. An $(m, n, d)_\Sigma$ erasure code can be a pair of algorithms which both encode: $\Sigma^n \to \Sigma^m$, and decode: $\Sigma^{m-d+1} \to \Sigma^n$, such that as long as the number of erasures is bounded by d−1, decode can always recover the original data. A code can be maximum distance separable (MDS), if n+d=m+1.

As an example, (m, n, d) erasure-coded copy of the data can be stored in step buffer C, where m=$\Theta$(n), and d=m−n+1=$\Theta$(n), meaning that the code is MSD. Buffer C can be different from other buffers in that it does not immediately get updated upon a client write, meaning that a client may update the data in the server side storage without such updated data being reflect in buffer C. Therefore, buffer C may at times contain stale data. In certain embodiments, the erasure-coded copy of data contains n+cn number of blocks in buffer C for some small constant c>0.

When the client needs to update block n in buffer C, the client also needs to update all of the other cn parity blocks. Doing this may require a significant amount of bandwidth and resources. To solve this issue, a client can be made to place newly updated blocks into separate buffer H 120. Thereby, data blocks are stored in two different buffers are created. An erasure coded copy can be stored in buffer C 110, and newly inputted data can be placed in buffer H 120. During the auditing process 140, the client may sample blocks from both buffer C and buffer H, thereby avoiding any possible issues involved with the staleness of the data contained in buffer C. Buffer U may not be used during the auditing process 140.

In certain other embodiments, a separate, up-to-date, and memory-checked copy of all blocks can be kept in its original unencoded format in buffer U 130. Raw buffer U is helpful in that it allows efficient reads occur. Because in certain embodiments data blocks are kept in two separate buffers, buffer C and buffer H, a need arises for the client to more efficiently read data without needing to read data from two separate buffer. Buffer U solves this issue. By storing a copy of all blocks 130, both original and updated, a client can perform a read by reading the corresponding location in buffer U. If a client performs a write, buffer U can be updated immediately with the newly written block.

In certain embodiments, buffer H contains a small erasure-coded log structure. In such embodiments, updating blocks in the buffer H can be relatively efficient. In certain other embodiments, however, when the log structure in buffer H grows large, updating the blocks in buffer H can cause an overhead roughly proportional to cn, similar to updating buffer C.

To achieve efficient amortized cost for updating H upon writes, certain embodiments use a hierarchical log structure having [log n]+1 levels of exponentially growing capacity, where level i represents an erasure coded copy of $2^i$ blocks; after every $2^i$ write operations, level i will be rebuilt. In some embodiments, erasure-coded copy C can be informally thought of as the top level of the hierarchical log of H, and can be rebuilt every n write operations.

Figure 2:
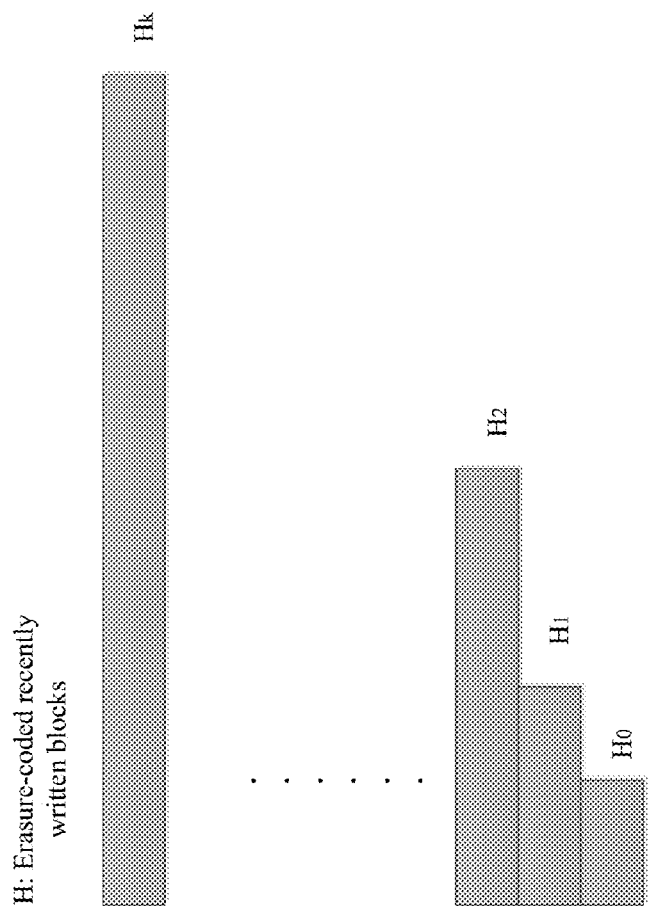
FIG. 2 illustrates a diagram of erasure-coded recently written blocks according to certain embodiments.

FIG. 2 illustrates the log hierarchical structure exhibited by certain embodiments of the H buffer. H contains 1+k levels, where k=[log n]. Each level is represented as $H_0, H_1, H_2, \ldots, H_k$. Each level $l \in \{0, 1, \ldots, k\}$ can be an erasure code of some $2^1$. In the embodiment illustrated in FIG. 2, level $H_0$ contains the most recently written block, while $H_1$ can contain the oldest blocks. In this embodiment, $H_0$ contains the least amount of data, while $H_1$ contains the most amount of data.

In certain other embodiments, the client can keep writing the same block, represented by $B_i$ where $i \in [n]$. In this embodiment, the hierarchical log structure of buffer H contains multiple copies of $B_j$.

Figure 3:
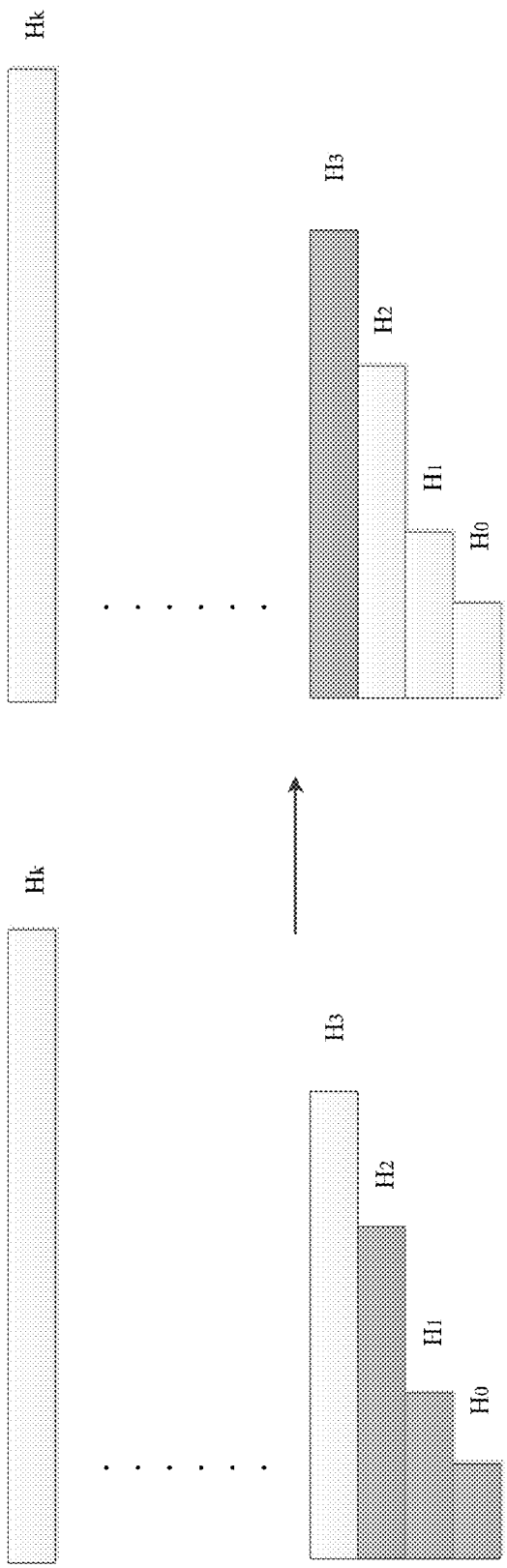
FIG. 3 illustrates a diagram of erasure-coded log structure of recently written blocks according to certain embodiments.

FIG. 3 illustrates the rebuilding of the data block in level $H_3$ in certain embodiments of the hierarchical log structure of bugger H. As shown, the data blocks in levels $H_0, H_1$, and $H_2$ are completely filled. The data blocks of $H_0, H_1$, and $H_2$, therefore will be combined via a butterfly network to construct level $H_3$. Rebuilt $H_3$, therefore, now contains all the data the blocks that were previously in $H_0, H_1$, and $H_2$.

As mentioned above POR involves, in part, a reading, writing, and auditing function. Certain embodiments of the server side storage presented above contain three different buffers. The reading, writing, and auditing operations may include the use of only one buffer, or may include the use of all, some, or any combination of the buffers thereof. In addition, any processes described below that occur in a certain buffer, are not limited to such buffer, and can be undergone in any one buffer, or combination of multiple buffers. In the embodiment described in FIG. 1, audit 140 involves checking the authenticity of O($\lambda$) random blocks from the buffer C, and from each filled level $H_1$, where $l \in [k]$ in buffer H. Auditing, therefore, does not use buffer U in the embodiment illustrated in FIG. 1. Rather, auditing includes probabilistically checking both the erasure copy stored in buffer C and the newly updated blocks stored in buffer H.

The reading operation, in certain embodiments, can be done by reading the data blocks in raw buffer U. Upon reading the data in raw buffer U, the server side storage will provide the client with both the data block located in buffer U, and the respective Merkle hash tree proof, allowing the client to verify the authenticity and freshness of the block.

The writing operation, in certain embodiments, not only updates raw buffer U, but can also cause the newly written block to be added to the hierarchical log structure H. Whenever a block is added to buffer H, assume that levels $H_0, H_1, \ldots, H_l$ are consecutively filled where l<k, and level l+1 is the first empty level. As illustrated in FIG. 3, level $H_{l+1}$ can be rebuilt, meaning that all blocks currently residing in level $H_0, H_1, \ldots, H_l$ are moved into $H_{l+1}$, and levels $H_0, H_1, \ldots, H_l$ are emptied. Such a scheme allows for the updating of the data blocks in logarithmic time, rather than in linear time. In addition, this scheme provides a simplified method of computing linear combinations of blocks.

Figures 4, 4E:
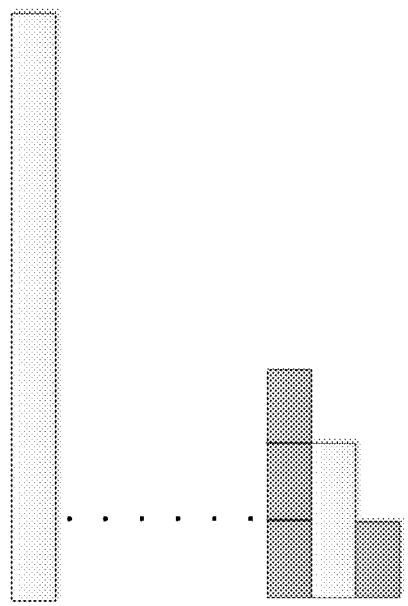

FIGS. 4(a)-4(e) illustrate how new data enters, and can be sorted by the hierarchical log structure of buffer H. In FIG. 4(a) a new data block is written into buffer H and fills up the first level $H_0$. In FIG. 4(b), a new data block is written into buffer H. Rather than filling the next available level on its own, both the new data block and the old data block get transferred together to the next available level $H_1$. In FIG. 4(c), a new data block is written into buffer H, and the data block will settle in $H_0$, since it is available. Now, however, both $H_0$ and $H_1$ are filled. All the data contained therein will be moved to the next available data block in level $H_2$. Now, when a new data block is written into buffer H, as illustrated by FIG. 4(e), the data block will simply occupy empty level $H_0$. This process of filling empty levels, and emptying full levels will continue for an n number of write operations.

In certain embodiments, every n write operations, the erasure coded copy C may be rebuilt, and all levels $H_0$, $H_1$, ..., $H_l$ are emptied. At the time C is rebuilt, all duplicates will be suppressed, and only the most recent copy of each block will be rebuilt into C. In some embodiments, the cost of rebuilding can be $O(\beta n \log n)$. Because in this embodiment C may be rebuilt every n write operations, the amortized cost can be $O(\beta \log n)$ per write.

The relationship between C and H, and the characteristics of the rebuilding algorithm mentioned above satisfy the necessary retrievability guarantees needed for a successful audit. To ensure that the retrievability guarantees are met, certain embodiments of the rebuilding algorithm maintain the following invariant:

Treat C as the (k+1)-th level $H_{k+1}$. Certain embodiments will maintain the invariant that each level $H_l$ where $l \in \{0, 1, ..., k+1\}$ can be a $(m_l, 2^l, d_l)$ erasure coding of $2^l$ blocks, where $m_l = \Theta(2^l)$. This encoding may be a maximum distance encoding scheme, such that $d_l = m_l - 2^l + 1 = \Theta(2^l)$, meaning that the encoding of level $H_l$ can tolerate up to $d = \Theta(2^l)$ erasures.

In certain embodiments, each level may be encoded into exactly twice as many blocks, meaning that $H_l$ may be a $(2^{l+1}, 2^l, 2^l)$ erasure encoding of $2^l$ recently written blocks. Similarly, C can also be encoded into twice as many blocks.

As discussed above, in certain embodiments the audit algorithm checks $O(\lambda)$ blocks for each level $H_l$ and for C. In some embodiments, the storage side server has to delete more than half of the blocks in any level $H_l$ or C to incur any data loss. Checking random blocks using certain embodiments of the above specified auditing scheme however, can detect this data loss (with a probability of at least $1-2^{-\lambda}$). As such, the audit algorithm can detect any data loss with overwhelming probability.

Figure 5:
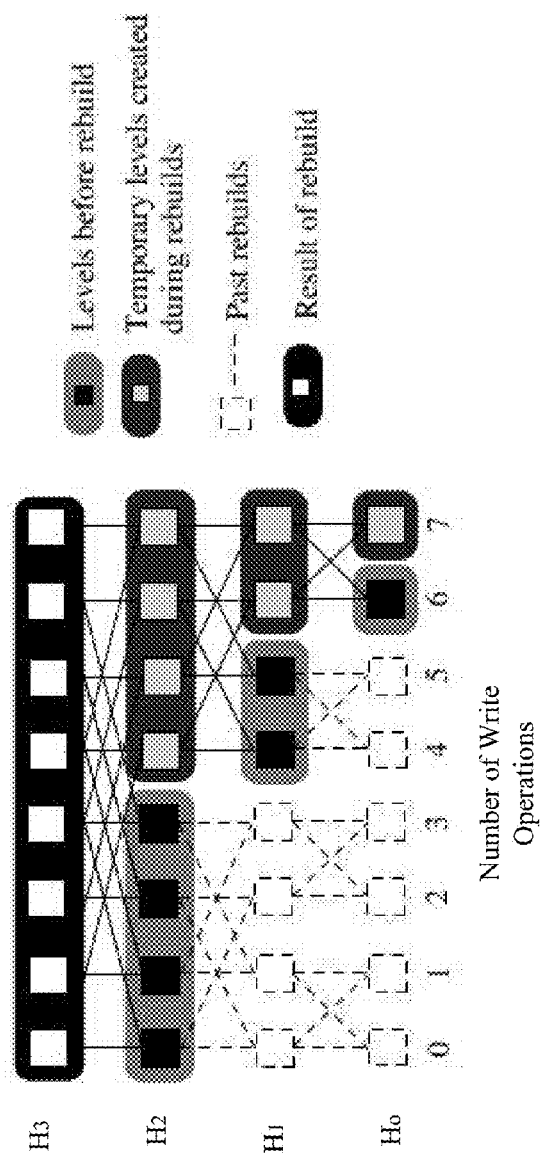
FIG. 5 illustrate a diagram of erasure-coded recently written blocks according to certain embodiments.

The following table represents the results of certain embodiments of the POR scheme:

In certain embodiments, a fast incrementally constructible code based on Fast Fourier Transform (FFT) can be utilized in the H buffer. In this construction, each level $H_l$ contains two size-$s^1$ FFT-based codes. Because FFT can be computed using a standard divide-and-conquer strategy, forming a butterfly like network, as shown in FIG. 5. In FIG. 5, the 8-th write operation encounters a full $H_0$, $H_1$, and $H_2$. Blocks $H_0$, $H_1$, and $H_2$, as well as the newly written block will then be encoded and written into one block on level $H_3$. In some embodiments, the $H_l$ can be computed from two $H_{l-1}$'s in time $O(B \cdot 2^l)$. The oblivious sorting in ORAM scheme, on the other hand, takes time $O(B \cdot l \cdot 2^l)$ to rebuild level $H_l$, making it slower and significantly less efficient. In other embodiments a known linear-time construction code can be used, which takes $O(c)$ time to encode c blocks.

In the above embodiment, shown in FIG. 5, level $H_l$ contains $2^l$ blocks, which can be encoded into $2^{l+1}$ codeword blocks, such that knowledge any $2^l$ codeword blocks can recover the original $2^l$ blocks. In some embodiments level $H_l$ are denoted as a vector $x_l$, where each block in $x_l$ arrived at time t, t+1, t+2, ..., t+$2^l$-1 (mod n) respectively. For level $H_l$ t is always a multiple $2^l$, in certain embodiments. Time t can be incremented for write requests.

In certain other embodiments, level $H_l$, contains code blocks output by the following linear encoding scheme: $H_l := \pi_l(x_l)[F_l, D_{l,t} F_l]$, where $F_l$ is a $2^l \times 2^l$ Fourier Transform matrix. $D_{l,t}$ can be a diagonal matrix defined as: $D_{l,t} := \text{diag}(\omega^{\varphi_{k-l}(t)}, \omega^{\varphi_{k-l}(t+1)}, ..., \omega^{\varphi_{k-l}(t+2^l-1)})$. $\varphi_c(i)$ denotes a partial bit-reversal function that reverses the least significant c bits of an integer i. $\pi_c(x)$ denotes a partial bit-reversal permutation, where index i is permuted to index $\varphi_c(i)$.

From the above calculations, it can be deduced that any $2^l \times 2^l$ submatrix of the generator matrix $G_l := [F_l, D_{l,t} F_l]$ is full rank. This lemma means that in certain embodiments having any $2^l$ (out of $2^{l+1}$) code blocks, all original blocks can be recovered in that level. This divide-and-conquer strategy for computing FFT transforms, can efficiently be used to build codes over time.

In certain other embodiments, big integer arithmetic in each block can be avoided by dividing the blocks into smaller segments. Avoiding big integer arithmetic will allow the POR scheme to need less server computations and client-server bandwidth. To do so, this embodiment defines a prime p using the equation p=an+1 for a small positive integer a, such that p can be represented with a basic integer type. Each block can then be divided into $\beta_0 := \lceil \log p \rceil$ bits. The mix algorithm described above can then be performed on each smaller segment of the block. Using a smaller p does not comprise the security of our scheme, since the parameter p can be part of the erasure coding, and prime p may not be related to the size of any cryptographic keys.

In certain embodiments, the last write time of the blocks in buffers H and C are computable from the current time t.

TABLE 1

BW and Sever cost table. β represents the block size (in terms of number of bits); λ represents the security parameter; n represents an upper bound on the number of block. Server cost includes the server-side disk I/O cost, and server computation, while BW is the client-server bandwidth cost.

| Client | | Write Cost | | Audit Cost | | |
|---|---|---|---|---|---|---|
| Storage | Server Cost | BW | Server Cost | BW | | Verifiability |
| $O(\beta)$ | $O(\beta \log n)$ | $\beta + O(\lambda \log n)$ | $O(\beta \lambda \log n)$ | $\beta + O(\lambda^2 \log n)$ | | secret |
| $O(\beta \lambda)$ | $O(\beta \log n)$ | $\beta(1 + \epsilon) +$ $O(\lambda \log n)$ for any constant $\epsilon > 0$ | $O(\beta \lambda \log n)$ | $O(\beta \lambda \log n)$ | | public |

In such embodiments, the client can simply use time and location encoded MACs to ensure authenticity and freshness of blocks in buffers H and C. In some embodiments, the blocks in buffer U need random access, and therefore cannot rely on MACs. Instead, a standard Merkel hash tree (i.e. memory checking) can be used to ensure freshness and authenticity of blocks in buffer U.

In certain embodiments, a construction can be implemented in which the bandwidth and the client computation overhead can be improved. In this new construction, writing a block incurs only $\beta+O(\lambda \log n)$ cost, where $\lambda$ is the security parameter and the typical value for $\lambda$ can be 128 or 256 bits. This means that the bandwidth overhead and the client computation for write operations of the improved POR construction can be analogous to that of a Merkel hash tree.

Further, in this construction, the storage side server will perform the computation on behalf of the client, thus significantly reducing the client computation and bandwidth. The algorithms for rebuilding each $H_l$ or C are publicly known to the storage side server, which enables the server to perform the rebuilding on its own. The client, in this embodiment, therefore, simply needs to check that the server performed the rebuilding correctly. To improve the efficiency of the rebuilding of $H_l$ and C buffers, certain embodiments can attach a homomorphic checksum along with each block in the hierarchical log structure H or C.

Each homomorphic checksum can be a collision-resistant summary of a block. Instead of performing the rebuilding over real data blocks, these homomorphic checksums enable the client to simply download checksums, check their authenticity, and performs the rebuilding over these homomorphic checksums.

In some embodiments, the homomorphic checksums for each block can be tagged with its position and time written, and stored on the server in encrypted and authenticated format. This embodiment ensures that the server does not know the values of the homomorphic checksum, which can be necessary for security, and enables the client can always verify the correctness and freshness of the homomorphic checksum retrieved.

Certain embodiments of the POR scheme may use homomorphic checksums that are not publicly verifiable, while others can use homomorphic checksums that are publicly verifiable. In those embodiments that use homomorphic checksums that are not publicly verifiable, the POR scheme can with become secretive, or remain publicly verifiable. This means that in certain embodiments the PoR scheme can remain public even if a homomorphic checksum that is not publicly verifiable is used.

In some embodiments, in which the block can be segmented into $\beta_0=\lceil \log p \rceil$, and block B can be written in the form of $B \in \mathbb{Z}_p^{[\beta/\beta_0]}$, a homomorphic checksum scheme can be defined as follows:

$sk \leftarrow \mathbb{K}(1^\lambda)$. The key generation algorithm $\mathbb{K}$ takes in the security parameter $1^\lambda$, the block size $\beta$, outputting a secret key sk.

$\sigma \leftarrow \mathbb{S}_{sk}(B)$. The authentication algorithm $\mathbb{S}$ takes in the secret key sk, a block $B \in \mathbb{Z}_p^{[\beta/\beta_0]}$, and outputs a checksum $\sigma$. In certain embodiments $\sigma$ can have a bit-length of $O(\lambda)$.

In certain embodiments, the homomorphic checksum scheme can be unforgeable, meaning that for any (polynomial-time) adversary A, $$Pr\begin{bmatrix} sk \leftarrow \mathbb{K}(1^\lambda) & B_1 \neq B_2 \\ & : & \\ B_1, B_2 \leftarrow A(1^\lambda) & \mathbb{S}_{sk}(B_1) = \mathbb{S}_{sk}(B_2) \end{bmatrix} \leq negl(\lambda).$$

According to some embodiments, an adversary who has not seen the secret key sk or any checksum cannot produce two blocks $B_1$ and $B_2$ that result in the same checksum. The clients, in some of the embodiments, encrypts all checksums before storing them at the server, thus the server does not see the secret key or any checksum.

In certain embodiments, the homomorphic checksum scheme can be designed to achieve additive homomorphism. This means that for any $sk \leftarrow \mathbb{K}(1^\lambda)$, for any blocks $B_1$, $B_2 \in \mathbb{Z}_p^{[\beta/\beta_0]}$, for any $a_1, a_2 \in \mathbb{Z}_p$, the following relationship holds: $a_1 \mathbb{S}_{sk}(B_1) + a_2 \mathbb{S}_{sk}(B_2) = \mathbb{S}_{sk}(a_1 B_1 + a_2 B_2)$.

Certain embodiments of the invention employ the following checksum scheme:

$\mathbb{K}(1^\lambda)$: The client picks a random matrix $M \xleftarrow{\$} \mathbb{Z}_p^{p \times [\beta/\beta_0]}$ and lets sk:=M. The number of rows p can be chosen such that $p\beta_0 = O(\lambda)$, where the resulting checksum can have about $O(\lambda)$ number of bits.

$\mathbb{S}_{sk}(B)$: on input a block $B \in \mathbb{Z}_p^{[\beta/\beta_0]}$, compute checksum $\sigma := M \cdot B$.

The checksum can compress a block from $\beta$ bits to $O(\lambda)$ bits.

Some of the above embodiments satisfy both the additive homomorphism and the unforgeability notions, as described above.

In certain embodiments of the homomorphic checksums, a very small p can be used. In one specific embodiment, $p=3 \cdot 2^{30}+1$, and therefore checksum operations do not need big integer operations and are highly efficient.

In some of the embodiments described above, relying on checksums can reduce the bandwidth cost and the client computation to $\beta+O(\lambda \log n)$, as shown in Table 1, for write operations. In certain embodiments to fully implement the checksums, for every block stored on the server, whether encoded or uncoded, in buffers U, C, and H, the client attaches a homomorphic checksum, which can be encrypted under an authentication encryption scheme $AE:=(\mathbb{E}, \mathbb{D})$. If $sk:=(M, sk_0)$ denote the client's secret key (unknown to the server). Specifically, $M \in \mathbb{Z}_p^{p \times [\beta/\beta_0]}$ can be the random matrix used in the homomorphic checksum scheme, and $sk_0$ can be a master secret key used to generate one-time keys for the authentication encryption scheme AE.

For the buffers C and H, suppose a block B can be written to address addr on the server at time t. In certain embodiments, the client generates the following one-time key represented by $k=PRF_{sk_0}(0, addr, t)$, and attaches $\bar{\sigma}(B)$ with block B, where $\bar{\sigma}(B):=AE.\mathbb{E}_k(\mathbb{S}_M(B))$. In certain embodiments of buffer U, the client can use a fixed encryption key $k=PFR_{sk_0}(0, addr, t)$ as blocks in U have unpredictable last-write times.

In the above embodiment, for each block in buffers H and C, its time and location dependent $\bar{\sigma}(B)$ allows the client to verify the authenticity and freshness of the block. In these embodiments, therefore, the client need not separately MAC the blocks in buffers H or C. For blocks in buffers U, a Merkel tree can be built over these $\bar{\sigma}(B)$'s, and the client keeps track of the root digest. After fetching a block B from buffer U, the client fetches its corresponding $\bar{\sigma}(B)$, verifies $\bar{\sigma}(B)$ with the Merkle tree, and verifies that the fetched block B agrees with $\bar{\sigma}(B)$.

As discussed above, in certain embodiment, the rebuilding algorithm in buffer H can be executed by the server, rather than the client. In order to enforce honest server behavior, however, the client performs the rebuild algorithm in buffer H, not directly over the blocks, but over $\tilde{\sigma}(B)$'s. In other words, instead of the client having to execute the rebuild algorithm on its own, in certain embodiments the client undergoes the following processes: i) whenever the client needs to read a block B from the server, it now reads $\tilde{\sigma}(B)$ instead. In the above, k=$PFR_{sk_0}$(0, addr, t), where addr is the physical address of block B, and t is the last time B is written. For any block in buffers H and C, the client can compute exactly when the block was written from the current time alone. If the decryption fails, the client will reject, meaning the server misbehaved; ii) whenever the client needed to perform computation over two blocks $B_1$ and $B_2$, the client now performs the same operation over the homomorphic checksum $\sigma(B_1)$ and $\sigma(B_2)$. Because certain embodiments of the rebuilding algorithm in buffer H only has addition and multiplication by known constants, the additively homomorphic checksum works; iii) whenever the client needs to write a block to the server, it now writes the new $\tilde{\sigma}(B)$ instead.

In certain embodiments, rebuilding C can also be based on homomorphic checksums. The server rebuilds C on behalf of the client, and the client only simulates the rebuilding of C operating on the $\tilde{\sigma}(B)$'s instead of the full blocks. In certain embodiment, however, buffer C can be rebuilt by computing an erasure code of the fresh data in U. In other embodiments, C may be rebuilt using the FFT-based code. The client simply has to simulate this encoding process using the $\tilde{\sigma}(B)$ rather than the data blocks. In such embodiments, the client-server bandwidth, as shown in Table 1, can be $O(\beta\lambda \log n)$ for each rebuilding of C.

In certain embodiments discussed above, audits may require transferring $O(\lambda)$ random from each level $H_l$ and from C. The audit cost in such an embodiment, as shown in Table 1, can be $O(\lambda\beta \log n)$. In certain other embodiments, however, this auditing cost can be reduced by aggregating the audited blocks using a linear aggregation scheme. In such embodiments, the client can check the aggregated clock using the homomorphic aggregate checksum. The following audit protocol can be used in such an embodiment:

i) Challenge. Client picks $O(\lambda)$ random indices for each level $H_l$ and for C. Client picks a random challenge $p_i \in \mathbb{Z}_p$ for each selected index. The random indices are denoted I:={$addr_1$, $addr_2$, ..., $addr_r$}, where r=$O(\lambda \log n)$. The random challenges are denoted R:={$p_1$, $p_2$, ..., $p_r$}. The client sends I:={$addr_1$, $addr_2$, ..., $addr_r$} and R:={$p_1$, $p_2$, ..., $p_r$} to the server.

ii) Response. Let $B_{addr}$ denote the block at addr. Server sends client the corresponding $\tilde{\sigma}(B_{addr})$ for each requested index r∈I. Server also computed $B^* = \sum_{i=1}^{r} p_i B_{addr_i}$, and send $B^*$ to the client.

iii) Verification. The client decrypts all $\tilde{\sigma}(B)$'s received and obtains $\sigma(B)$'s. Client computes $v = \sum_{i=1}^{r} p_i \sigma(B_{addr_i})$, and the checksum $\sigma(B^*)$. The client checks if $v \stackrel{?}{=} \sigma(B^*)$.

This procedure reduces the client-server bandwidth for audits in certain embodiments to $\beta + O(\lambda^2 \log n)$, as shown in Table 1, since only checksums and one aggregate block need to be communicated from the server to the client.

Certain other embodiments reduce the client-server bandwidth for write operations, at the expense of a slightly higher cost for audits. To do so, the client can group about $O(\log n)$ blocks into a bigger block when writing data to buffer H. A simple embodiment can be for the client to cache $O(\log n)$ blocks, and write them in a batch as a single bigger block. This embodiment reduces the amortized cost for writing on buffer H to $\beta + O(\lambda)$. The client-server bandwidth overhead costs for this embodiment can be broken down into two distinct parts. First, an overhead of about $O(\lambda \log n)$ may be needed due to the Merkle hash tree for the buffer U. Second, an overhead of about $O(\lambda)$ for writing on the log structure of buffer H. In response, the audit costs increases to $O(\lambda\beta \log^2 n)$, and increases an audit's client server bandwidth to $\beta \log n + O(\lambda^2 \log n)$.

Certain other embodiments employ a deamortization trick that can be used to spread the hierarchical encoding work over time, such that certain embodiments achieve good worst-case performance. This embodiment provides the benefits of experiencing a low amortized cost per write, and a good worst-case cost.

Other embodiments can use a bigger chunk size to reduce the number of seeks. These embodiments contain hierarchical log features sequential data access when rebuilding level $H_l$ from two arrays of size $2^{l-1}$. Due to this sequential access pattern, certain embodiments can use a bigger chunk size to reduce the number of seeks.

FIGS. 6(a)-6(c) illustrate evaluation charts for the performance overhead of write and audits of certain embodiments discussed above. FIG. 5(a) plots the total client-server bandwidth consumed for writing a 4 Kb block, for various storage sized. The dotted line is representative of the "hierarchical FFT encoding" curve, which represents the portion of the bandwidth cost dedicated to the rebuilding of the buffers C and H, $O(\lambda)$.

FIG. 5(b) is a chart of the write throughput of the second embodiment. The server's disk I/O cost can be about $O(\log n)$, meaning that it needs to read roughly $O(\log n)$ for every write operation. In certain embodiments, if server disk I/O was maxed out, the POR write throughput would be roughly 20 MB/s, when the smallest 10 levels of H in memory were cached. In certain other embodiments, the client-server bandwidth may be more likely to be the bottleneck, and the actual POR throughput achievable will be limited by the available client-server bandwidth.

FIG. 5(c) shows the time spent by the server for each audit operation-including time for reading disk and performing computation, but not including network transfer time between client server. The embodiment tested uses a $\lambda$ of 128, meaning that each audit samples 128 blocks from each level $H_l$ and buffer C. The majority of the time in FIG. 5(c) can be spent on disk I/O, and may be dominated by disk seeks. There are roughly $O(\lambda \log n)$ seeks per audit operation parallelized to 7 disks, and each seek take roughly 12 seconds.

As state above, in certain embodiments, even though the homomorphic checksum may require that the client keep secret states, this does not prevent the PPR scheme from allowing public verifiability. In a public verifiability setting, only a trusted data source can write data, but anyone can perform a read or an audit. In certain embodiments, public reads can simply be performed by utilizing buffer U.

To achieve public auditability, in certain embodiments, a separate Merkel hash tree needs to be built over the blocks of each level $H_l$, and one for C. The up-to-date root digests of all $O(\log n)$ will then be publicized. During a public audit, a user with the root digests requests $O(\lambda)$ blocks at random for each level $H_l$ and buffer C, and checks them with the root digests.

In certain embodiments, the trusted source keeps track of the root digests without having to transfer the original blocks during the rebuilding of the hierarchical level. To enable this feature, the server computes the new Merkle trees for a level when it is being rebuilt. When rebuilding, therefore, the following steps are applied: i) as in certain embodiment having a secretly-verifiable scheme, the trusted source downloads the encrypted/authenticated homomorphic checksums, and "simulates" the rebuilding over these $\tilde{\sigma}(B)$s; ii) the server performs the rebuilding, computes the new digest h of $H_l$, and commits h to the source; iii) The source challenges $O(\lambda)$ random blocks in $H_l$. For each challenge clock B, the source downloads the block itself B, its $\tilde{\sigma}(B)$, and the path in the Merkle tree necessary to verify block B. The client now checks that $\tilde{\sigma}(B)$ verifies for B, and that the already committed root digest h verified for B as well.

In the above embodiments, if the server can pass the probabilistic check, then at least a constant fraction of the rebuilt level $H_l$ (or buffer C) may be correctly incorporated into the claimed digest h. Due to POR's inherent erasure coding, this suffices to proving the retrievability of the publicly verifiable POR scheme. In addition, the write cost for this embodiment can be $\beta(1+\in)+O(\lambda \log n)$, as shown in Table 1.

In some embodiments the public verifiable approach described above demands $O(\lambda \log n(\beta+\log n))$ overhead for public auditing. Particularly, for each of the $O(\log n)$ levels $H_l$, as well as C, $O(\lambda)$ blocks need to be checked. Checking a block also involves downloading the block itself and log n hashes of the Merkle hash tree. In other embodiments, by carefully aligning the Merkle tree structure with the hierarchical log structure H, certain embodiments can further improve the public audit overhead to $O(\beta\lambda \log n)$, as shown in Table 1.

The public audit overhead can be further improved. In certain embodiments, instead of building a separate Merkle tree per level $H_l$, a single Merkle tree can be built over the entire hierarchical log structure of buffer H, and another can be built over buffer C. The Merkle tree may be aligned on top of the hierarchical structure H. In another embodiment, during public audits, the client randomly selects leaf nodes, and samples the blocks on these paths. As a result, $O(\lambda)$ blocks from each level gets sampled, and only $O(\lambda \log n)$ hashes can be transmitted to verify all the paths sampled—namely, hashes of all sibling nodes to the samples paths can be transmitted. This can reduce the public audit overhead to $O(\lambda\beta \log n)$, assuming $\beta=O(\lambda)$.

In certain other embodiments, when a non-top level $H_l$ gets rebuilt, the server can rebuild the Merkle hash tree, and the client can perform various probabilistic checking protocols. An example of one protocol includes retrieving all hashes at level $H_{l+1}$, and making sure that they are consistent with old digest. The client then randomly samples $O(\lambda)$ blocks at level $H_1$, to make sure that these blocks are correctly incorporated into the new root digest as claimed by the server. When the top level is rebuilt, the client can simply check $O(\lambda)$ blocks at level $H_1$ to make sure that they are correctly incorporated into the root digest.

Certain other embodiments of the public auditing scheme can also support insertions and deletions of blocks. Insertions can be supported by adding a level to the hierarchical log structure H whenever the number of blocks doubles. Deletions can be supported by updating the deleted block with ⊥. Whenever the number of deleted elements exceeds roughly half the size of the dataset, the client can rebuild and consolidate the hierarchical log by suppressing deleted items.

The features, structures, or characteristics of certain embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   storing an erasure coded copy of block data in a buffer of a storage server;
   storing newly updated block data into a separate erasure-coded log structure in another buffer of the storage server;
   auditing on the storage server both the erasure copy of block data in the buffer and the newly updated block data in the another buffer, wherein the erasure copy of block data and the newly updated block data are probabilistically checked during the audit; and
   outputting from the storage server to a user equipment a dynamic proof of retrievability output based on the auditing, wherein the proof of retrievability output provides provable storage guarantees that the storage server possess the block data and the updated block data, without individually downloading and checking all data stored in the storage server.

2. The method according to claim 1, wherein the auditing allows for public verifiability.

3. The method according to claim 1, wherein the auditing allows for secret verifiability.

4. The method of according to claim 1, further comprising:
   keeping a separate unencoded, up-to-date, memory-checked copy of the block data and the newly updated block data.

5. The method of according to claim 1, further comprising:
   writing the newly updated block data on the separate erasure-coded log structure and a separate unencoded, up-to-date, memory-checked copy of the block data,
   wherein the writing, which involves secret verifiability, requires a client-server bandwidth represented by the equation $\beta+O(\lambda \log n)$, where $\beta$ represents a number of bits, $\lambda$ represents security parameters, and n represents a total number of outsourced blocks.

6. The method according to claim 1, further comprising:
   reading the block data and the newly updated block data directly from a separate unencoded, up-to-date, memory-checked copy of the block data.

7. The method according to claim 1, wherein the audit, which involves secret verifiability, requires a client-server bandwidth represented by the equation β+O(λ^2 log n), where β represents the number of bits, λ represents the security parameters, and n represents the total number of outsources blocks.

8. A method, comprising:
storing an erasure coded copy of block data in a buffer on a storage server;
storing newly updated block data into a separate erasure-coded log structure in another buffer the storage server, wherein the log structure comprises at least one level;
auditing on the storage server both the erasure copy of block data in the buffer and the newly updated block data in the another buffer, wherein the erasure copy of block data and the newly updated block data are probabilistically checked during the audit;
writing the newly updated block data on the separate erasure-coded log structure in the another buffer, wherein the at least one level of the separate erasure-coded log structure are consecutively filled, and a rebuilding level is created, which comprises all the newly updated block data,
wherein the newly updated block data is updated in logarithmic time, and
wherein when the rebuilding level is created, at least one level of the separate erasure-coded log structure is emptied; and
outputting from the storage server to a user equipment a dynamic proof of retrievability output based on the auditing, wherein the proof of retrievability output provides provable storage guarantees that the storage server possess the block data and the updated block data, without individually downloading and checking all data stored in the storage server.

9. The method according to claim 8, further comprising:
keeping a separate unencoded, up-to-date, memory-checked copy of the block data and the newly updated block data.

10. The method according to claim 8, further comprising:
attaching a homomorphic checksum along with the erasure coded copy of block data and the newly updated block data.

11. The method according to claim 8, wherein the auditing comprises aggregating the erasure coded copy of block data and the newly updated block data with a linear aggregation scheme.

12. An apparatus, comprising:
at least one memory;
at least one processor;
wherein the at least one memory is configured with the at least one processor, to cause the apparatus at least to:
store an erasure coded copy of block data in a buffer of a storage server;
store newly updated block data into a separate erasure-coded log structure in another buffer of the storage server;
audit on the storage server both the erasure copy of block data in the buffer and the newly updated block data in the another buffer, wherein the erasure copy of block data and the newly updated block data are probabilistically checked during the audit; and
output from the storage server to a user equipment a dynamic proof of retrievability output based on the auditing, wherein the proof of retrievability provides provable storage guarantees that the storage server possess the block data and the updated block data, without individually downloading and checking all data stored in the storage server.

13. An apparatus according to claim 12, wherein the auditing provides a dynamic proof of retrievability output.

14. An apparatus according to claim 12, wherein the auditing allows for public verifiability.

15. An apparatus according to claim 12, wherein the auditing allows for secret verifiability.

16. An apparatus according to claim 12, wherein the at least one memory is also configured with the at least one processor, to cause the apparatus at least to:
keep a separate unencoded, up-to-date, memory-checked copy of the block data and the newly updated block data.

17. An apparatus according to claim 12, wherein the at least one memory is also configured with the at least one processor, to cause the apparatus at least to:
write the newly updated block data on the separate erasure-coded log structure and a separate unencoded, up-to-date, memory-checked copy of the block data,
wherein the writing, which involves secret verifiability, requires a client-server bandwidth represented by the equation β+O(λ log n), where β represents a number of bits, λ represents security parameters, and n represents a total number of outsources blocks.

18. An apparatus according to claim 12, wherein the at least one memory is also configured with the at least one processor, to cause the apparatus at least to:
read the block data and the newly updated block data directly from a separate unencoded, up-to-date, memory-checked copy of the block data.

19. An apparatus according to claim 12, wherein the audit, which involves secret verifiability, requires a client-server bandwidth represented by the equation β+O(λ^2 log n), where β represents a number of bits, λ represents a security parameters, and n represents a total number of outsources blocks.

* * * * *